(12) United States Patent
Glaum

(10) Patent No.: US 12,146,554 B2
(45) Date of Patent: Nov. 19, 2024

(54) COUNTER ROTATING GEAR CASE FOR A DRIVE UNIT

(71) Applicant: Michael C. Glaum, Crystal River, FL (US)

(72) Inventor: Michael C. Glaum, Crystal River, FL (US)

( * ) Notice: Subject to any disclaimer, the term of this patent is extended or adjusted under 35 U.S.C. 154(b) by 137 days.

(21) Appl. No.: 17/972,154

(22) Filed: Oct. 24, 2022

(65) Prior Publication Data

US 2023/0137602 A1 May 4, 2023

Related U.S. Application Data

(60) Provisional application No. 63/274,772, filed on Nov. 2, 2021.

(51) Int. Cl.
| | |
|---|---|
| *F16H 3/091* | (2006.01) |
| *F16H 1/22* | (2006.01) |
| *F16H 57/023* | (2012.01) |

(52) U.S. Cl.
CPC .......... *F16H 3/0915* (2013.01); *F16H 1/222* (2013.01); *F16H 57/023* (2013.01)

(58) Field of Classification Search
CPC ...... F16H 3/0915; F16H 1/222; F16H 57/023; B63H 5/10; B63H 2020/006
See application file for complete search history.

(56) References Cited

U.S. PATENT DOCUMENTS

| | | | | |
|---|---|---|---|---|
| 1,330,145 A | * | 2/1920 | Sherwood ................ | B63H 5/10 416/129 |
| 3,851,537 A | * | 12/1974 | Nickstadt ................ | F16H 55/22 74/404 |
| 5,009,621 A | * | 4/1991 | Bankstahl ................ | B63H 5/10 416/129 |
| 5,017,168 A | * | 5/1991 | Ackley .................... | B63H 5/10 416/129 |
| 5,247,856 A | * | 9/1993 | Cuypers .................. | F16H 1/222 74/665 F |
| 5,921,828 A | * | 7/1999 | Ogino ..................... | F16H 1/222 440/86 |
| 6,540,570 B1 | * | 4/2003 | Eakin ..................... | B63H 23/06 440/37 |
| 10,598,182 B2 | * | 3/2020 | Kou ....................... | F04D 19/024 |
| 11,339,860 B1 | * | 5/2022 | Smith ...................... | F16D 3/10 |

* cited by examiner

*Primary Examiner* — Jake Cook
(74) *Attorney, Agent, or Firm* — Ward and Smith, P.A.; Ryan K. Simmons

(57) ABSTRACT

A counter rotating gear case. The counter rotating gear case may include a forward gear assembly; an aft gear assembly; a pinion gear assembly; a spool adapter having a first portion and a second portion, wherein the forward gear assembly, the aft gear assembly, and pinion gear assembly may be supported on the second portion of the spool adapter; and wherein, the pinion gear assembly may be disposed between the forward gear assembly and the aft gear assembly, and wherein the pinion gear assembly may be operatively engaged with both the forward gear assembly and the aft gear assembly, such that rotation of one of the forward gear assembly or the aft gear assembly in one direction causes rotation of the other of the forward gear assembly or the aft gear assembly in a second direction opposite that of the first direction.

17 Claims, 22 Drawing Sheets

COUNTER ROTATING GEAR CASE FOR A DRIVE UNIT

RELATED APPLICATIONS

This application is related and claims priority to U.S. Provisional Patent Application No. 63/274,772, entitled "Counter Rotating Gear Case for Marine Drive Unit" filed on Nov. 2, 2021, the application of which is incorporate herein by reference in its entirety.

TECHNICAL FIELD

The subject matter of the present invention relates generally to a counter rotating gear case, and more particularly to a counter rotating gear case for converting a standard single prop drive unit to a double prop counter rotating drive unit.

BACKGROUND

Typical motors, such as trolling motors for boats, use a single (one) prop design. However, the single prop design can be inefficient. Since, trolling motors are typically battery powered, these inefficiencies can lead to reduced running time as the battery life may be drained quicker. This can be especially true in certain fishing conditions, such as in areas with higher aquatic vegetation, strong currents, rough water, chasing fast schools of fish, etc.

Additionally, anglers may want to change or customize their prop type/design based on certain types of fishing and/or conditions. For example, a bass angler may need a prop design that can more easily cut through aquatic vegetation (grass, lily pads, etc.), whereas an angler fishing inshore flats might need blades designed for higher speed for chasing fast larger fish. A typical trolling motor prop is not easily changed out, and may require differing drive units to accommodate the differing prop designs.

What is needed is an improved system and method of increasing the efficiencies of these types of motors, as well, as making it easier to modify such motors to customize to an anglers preference/type of fishing.

SUMMARY

In one embodiment, a counter rotating gear case is provided. The counter rotating gear case may include a forward gear assembly; an aft gear assembly; a pinion gear assembly; a spool adapter having a first portion and a second portion, wherein the forward gear assembly, the aft gear assembly, and pinion gear assembly may be supported on the second portion of the spool adapter; and wherein, the pinion gear assembly may be disposed between the forward gear assembly and the aft gear assembly, and wherein the pinion gear assembly may be operatively engaged with both the forward gear assembly and the aft gear assembly, such that rotation of one of the forward gear assembly or the aft gear assembly in one direction causes rotation of the other of the forward gear assembly or the aft gear assembly in a second direction opposite that of the first direction.

BRIEF DESCRIPTION OF THE DRAWINGS

Figure 1:
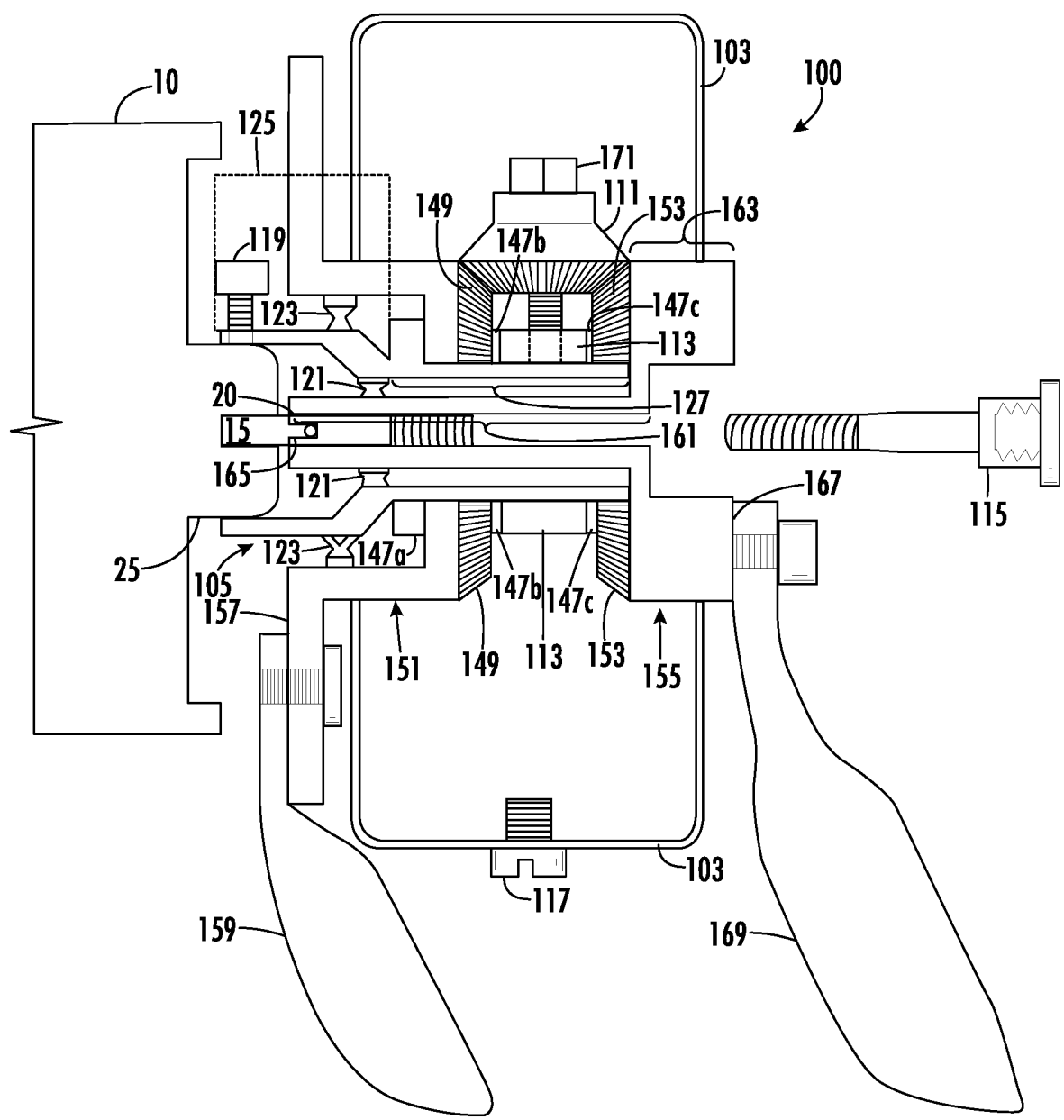
Figure 2:
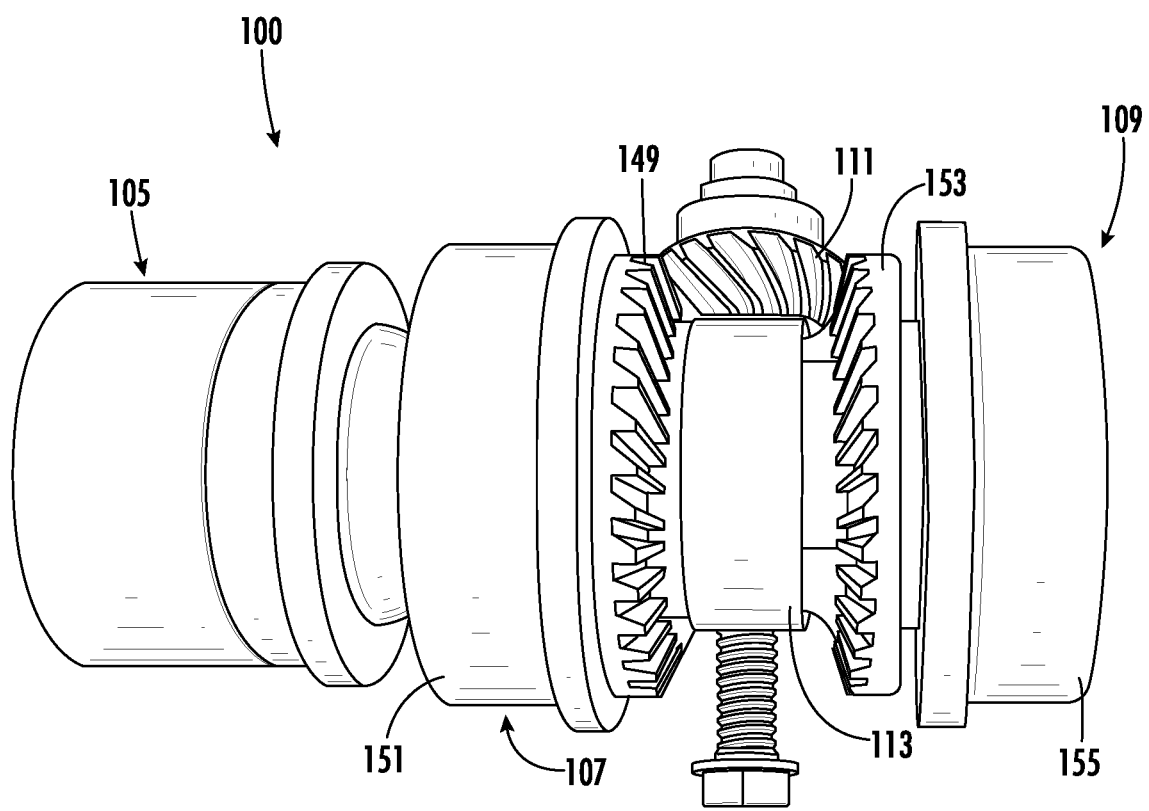
Figure 3:
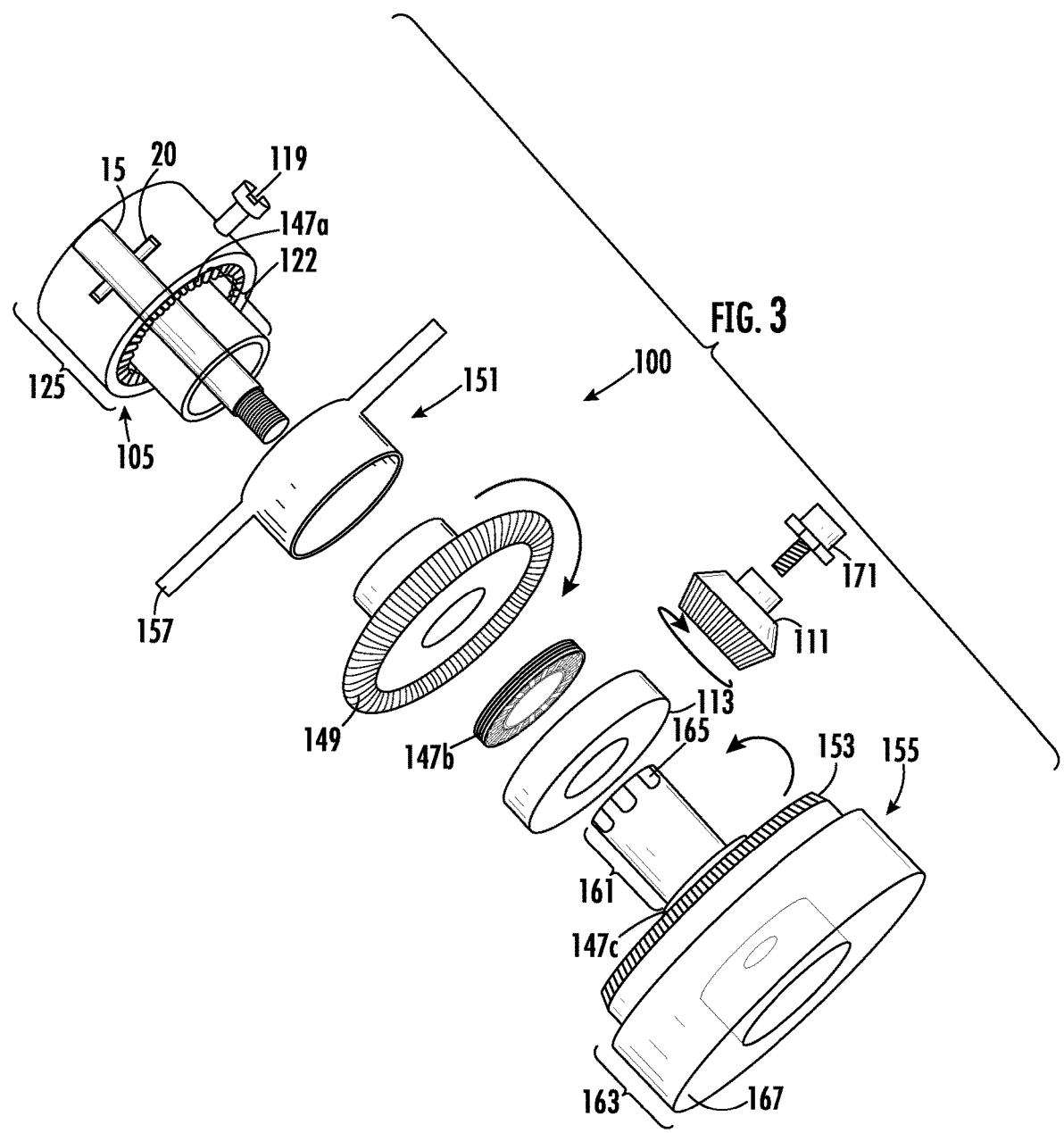
Figure 4:
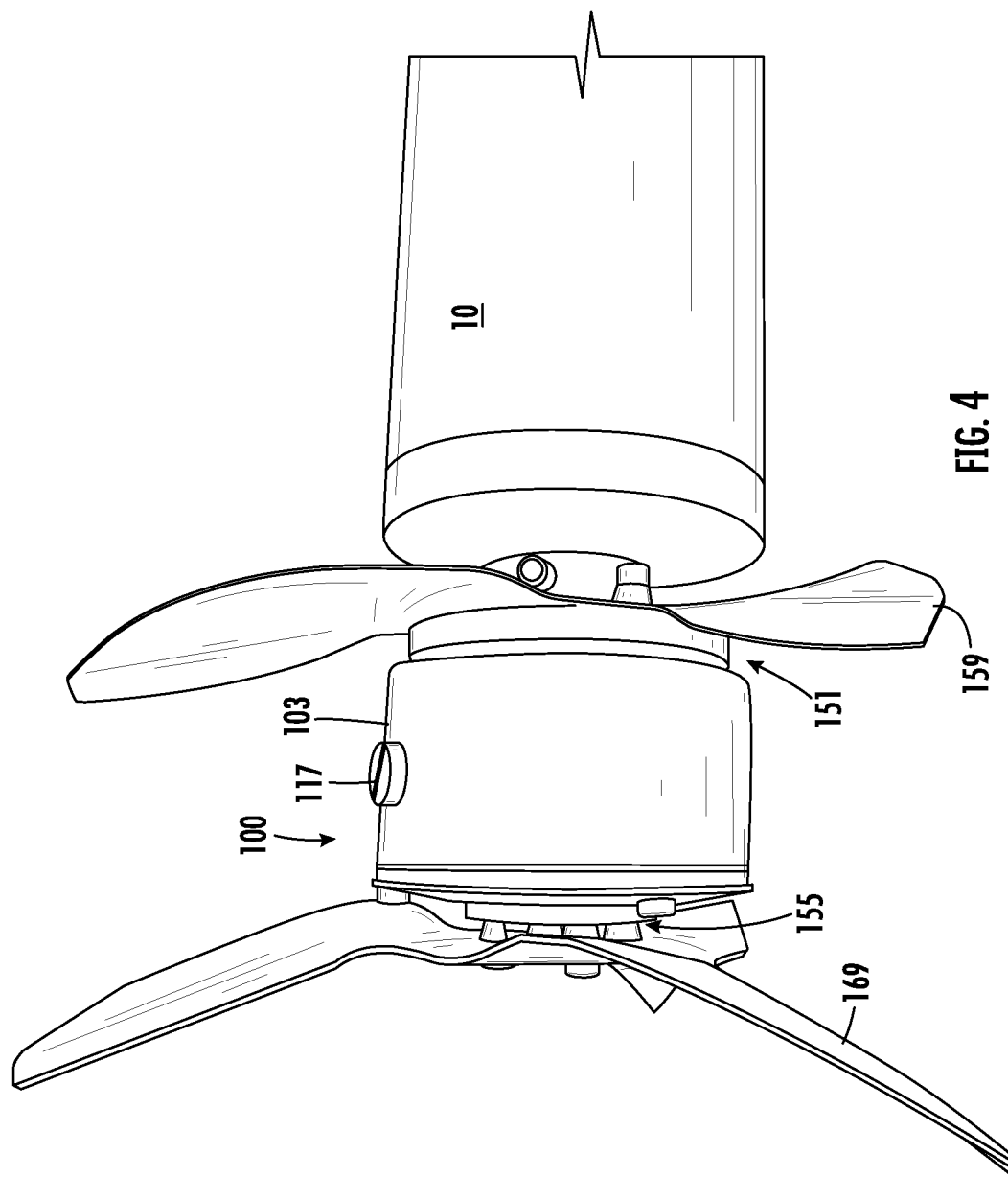
Figure 5:
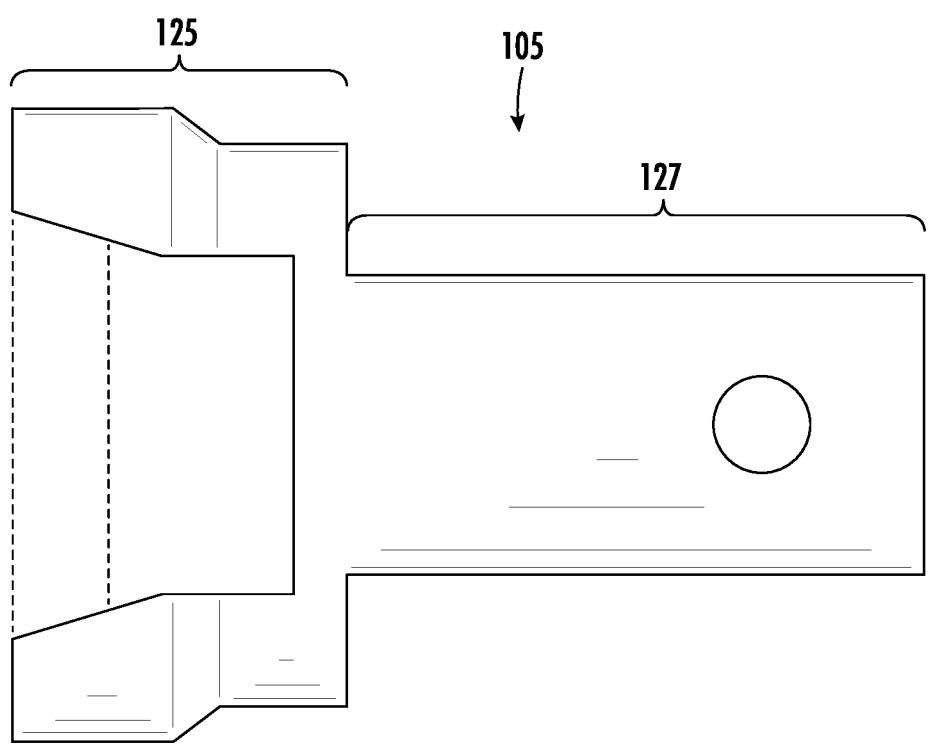
Figure 6:
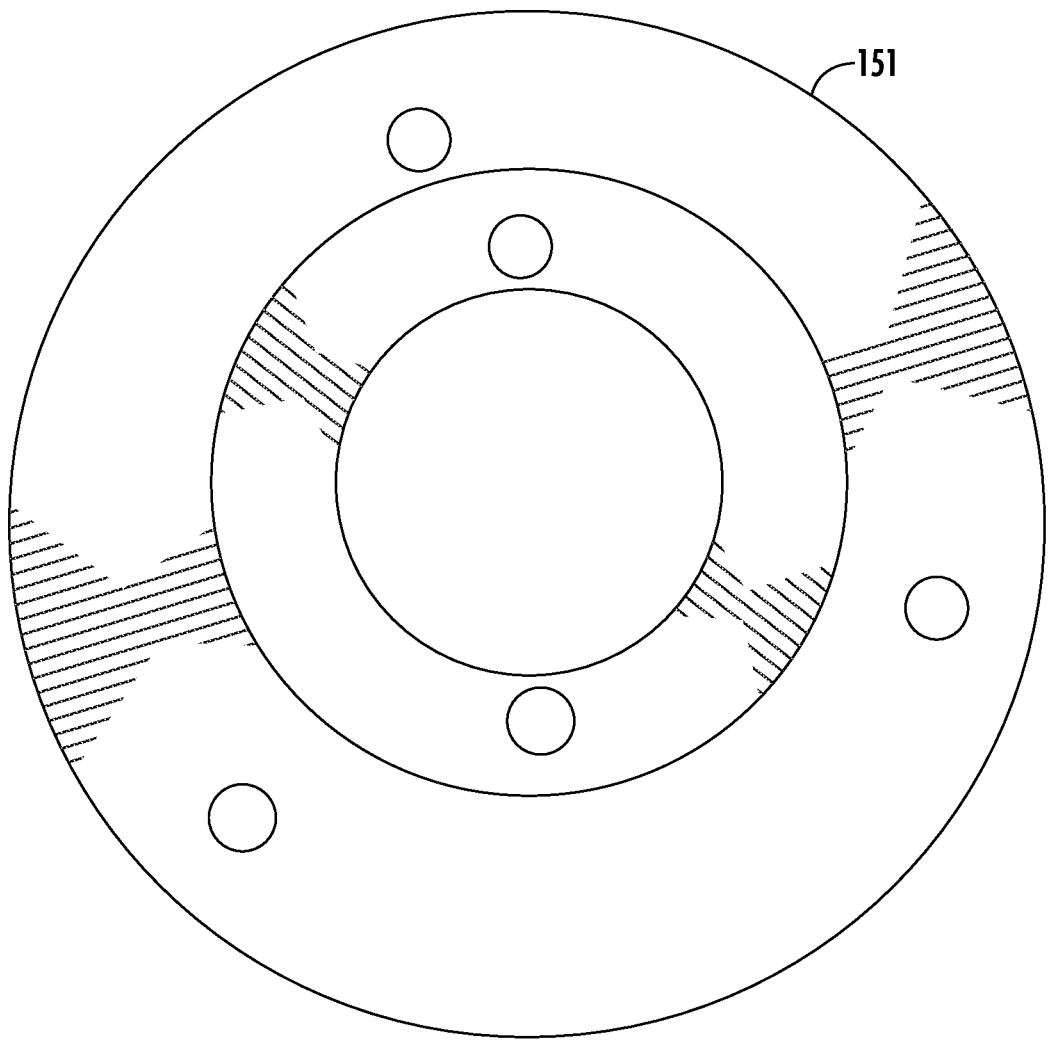
Figure 7:
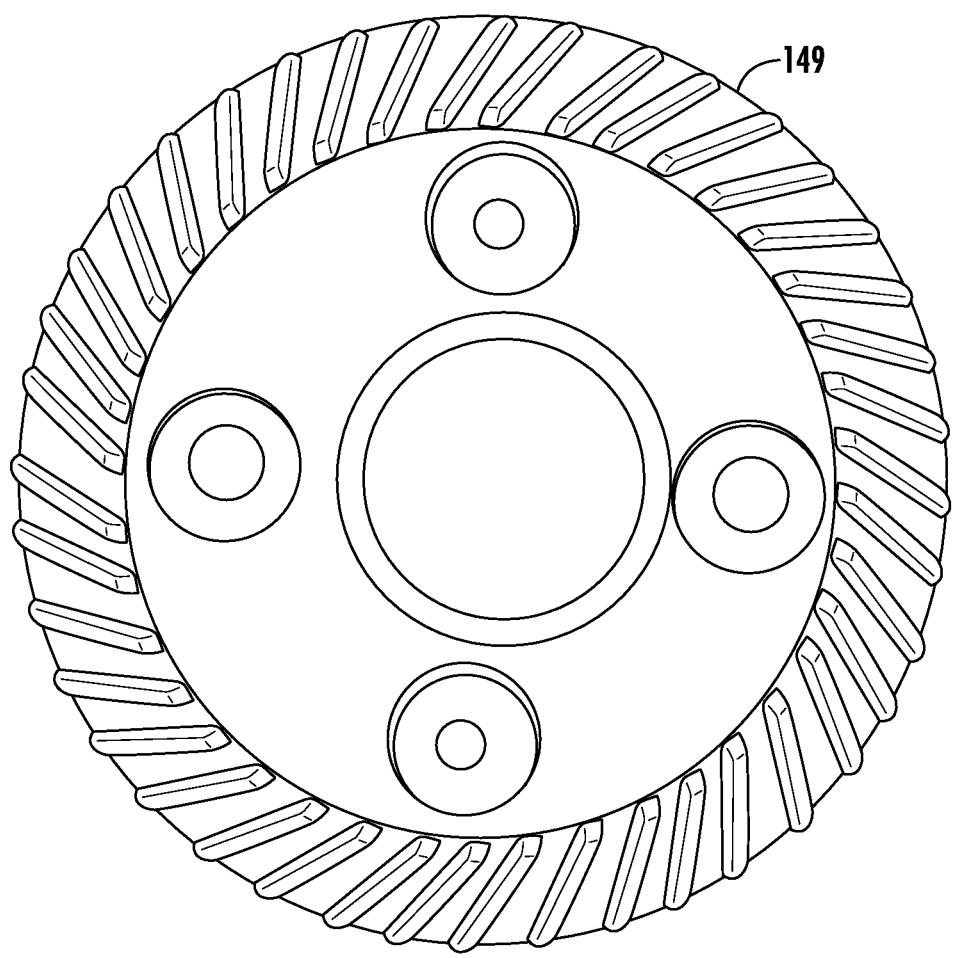
Figure 8:
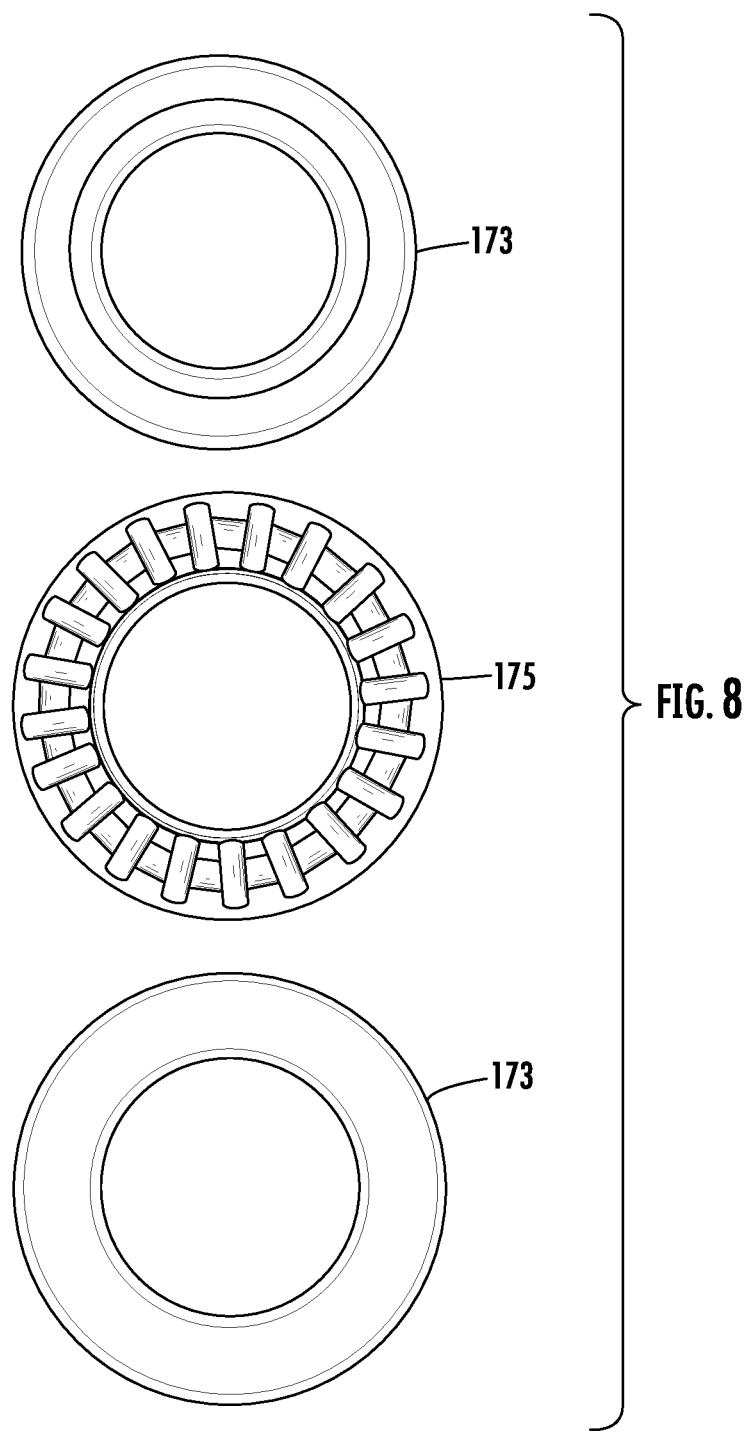
Figure 9:
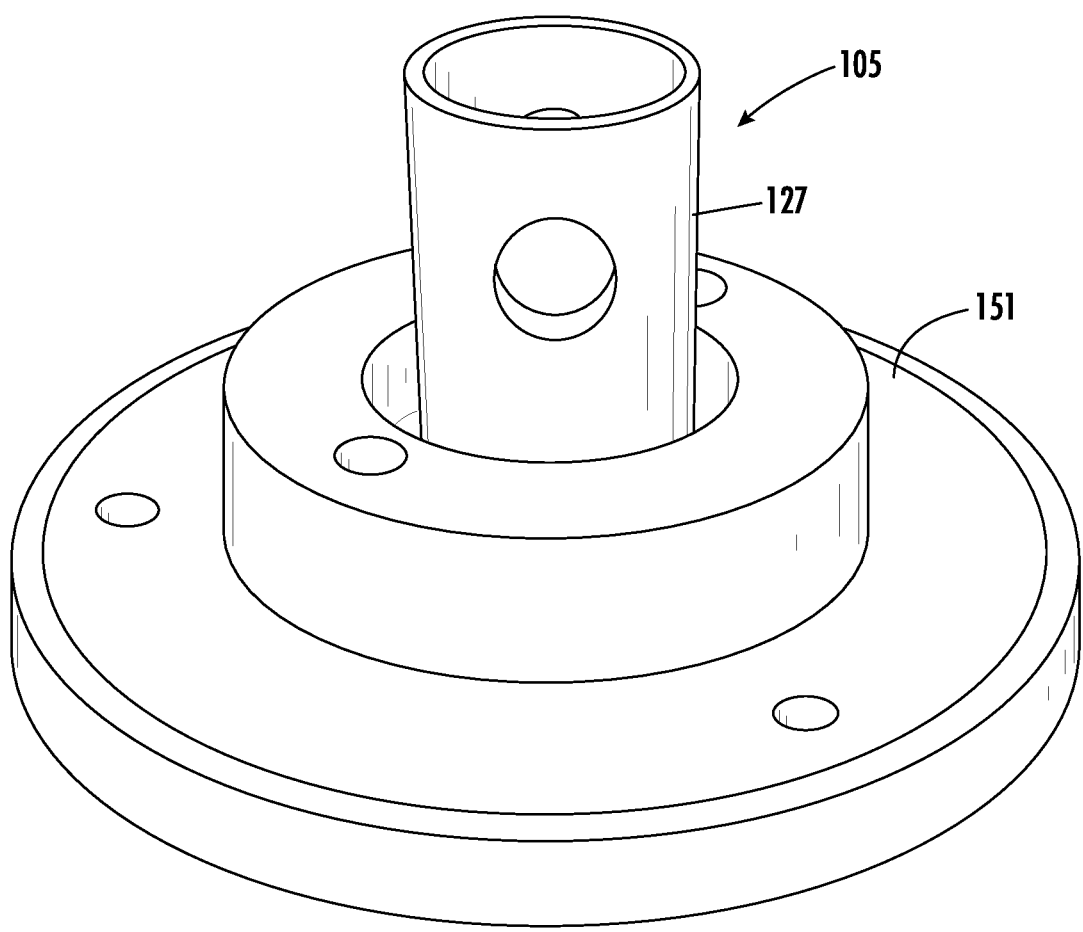
Figure 10:
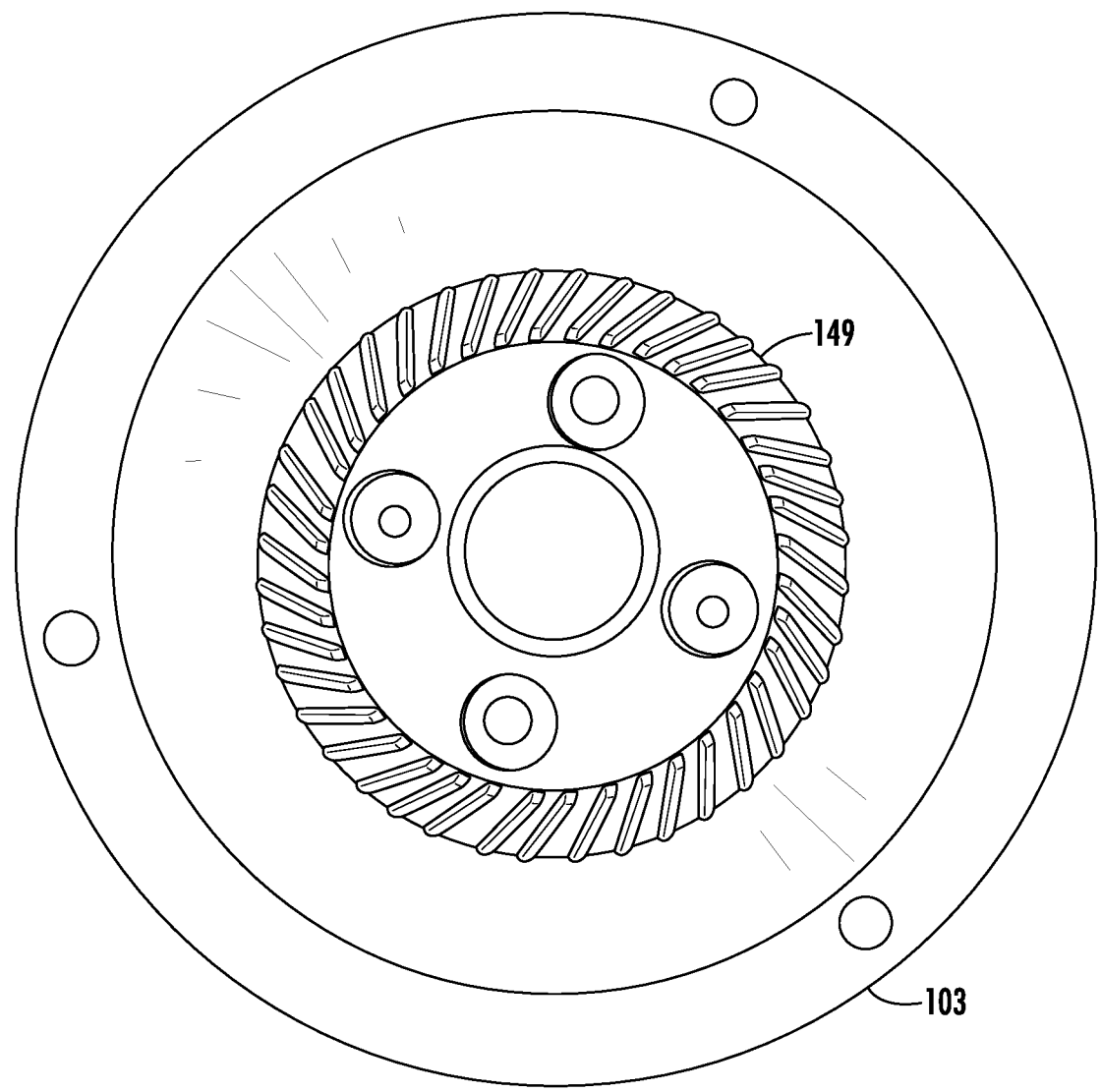
Figure 11:
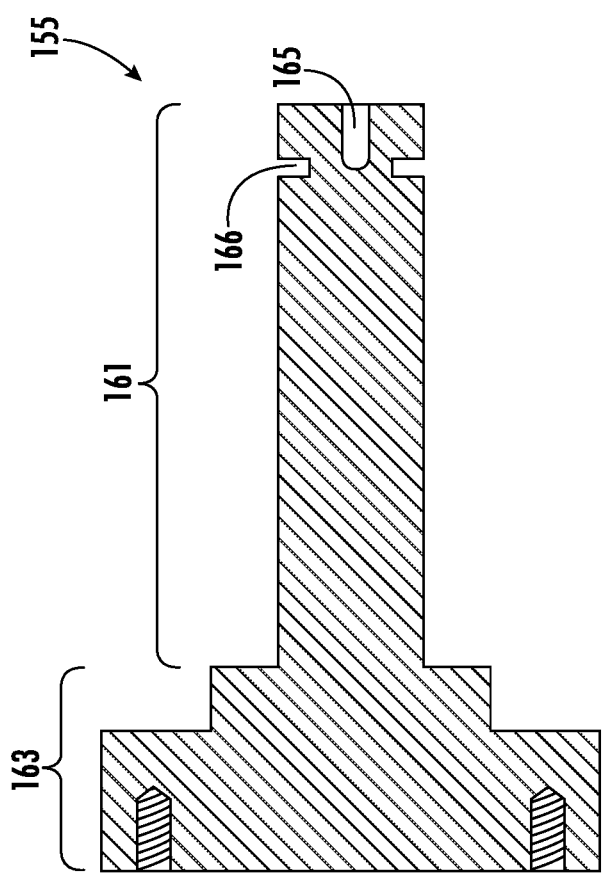
Figure 12:
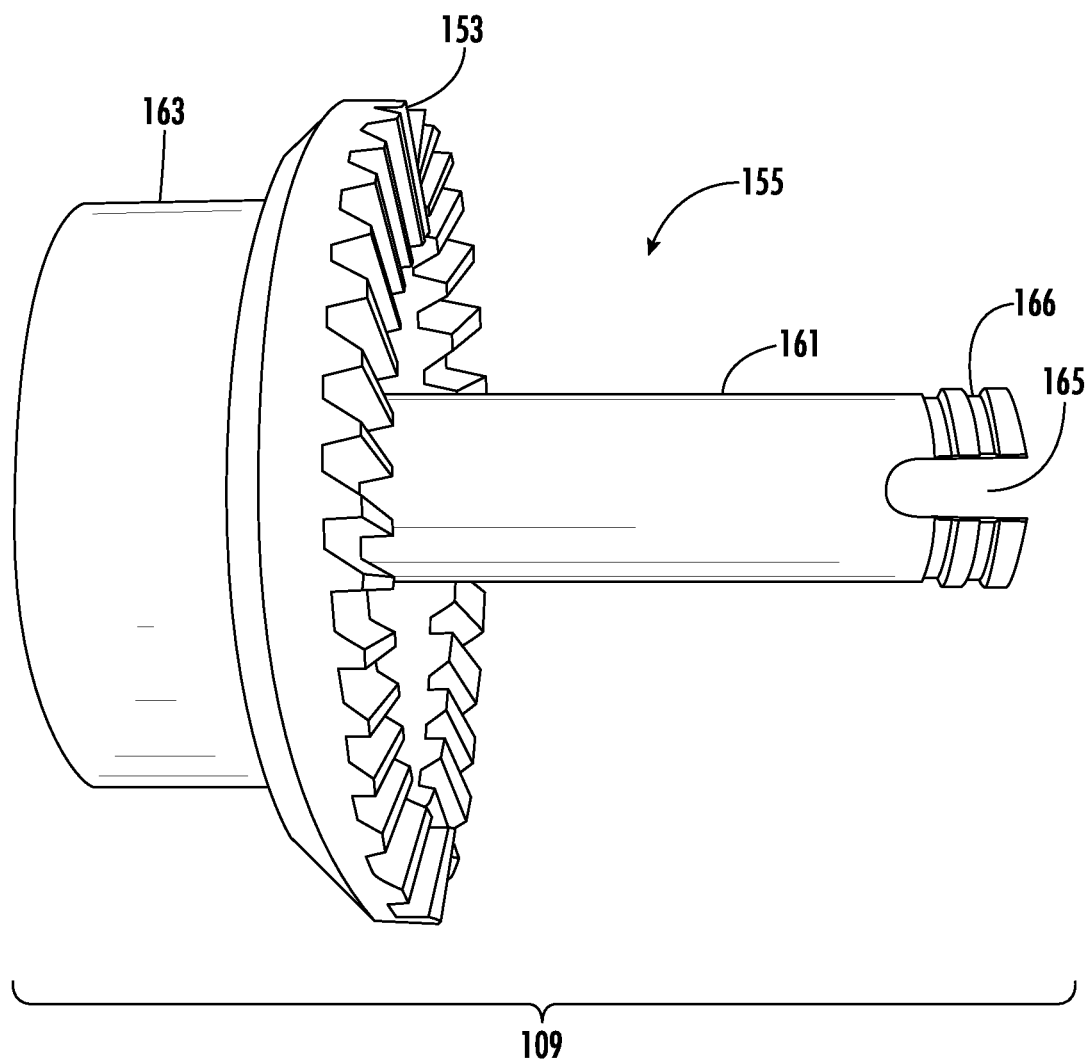
Figure 13:
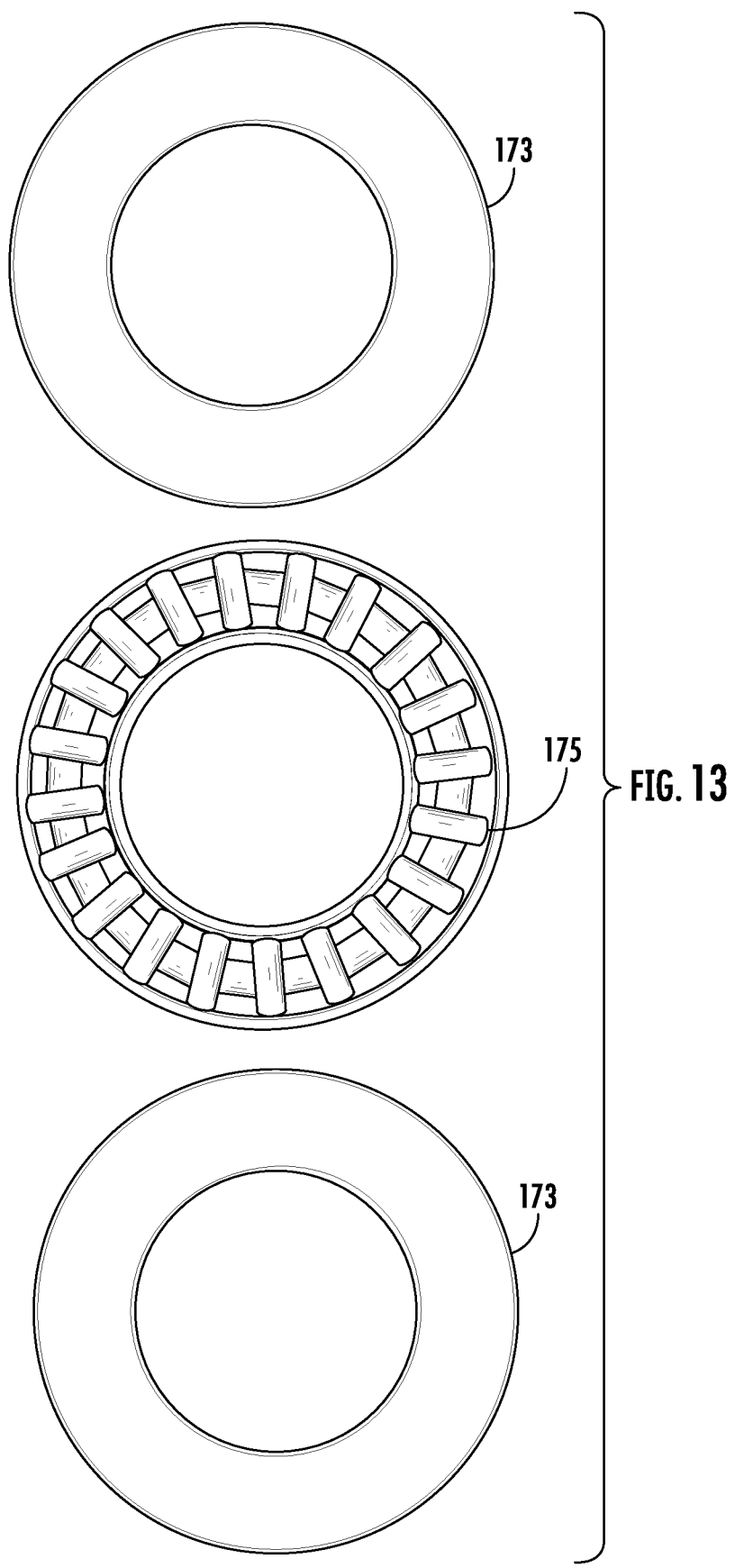
Figure 14:
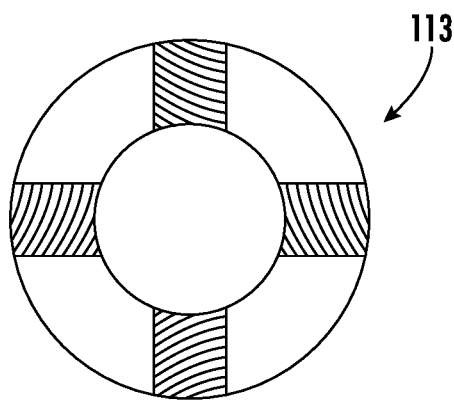
Figure 15:
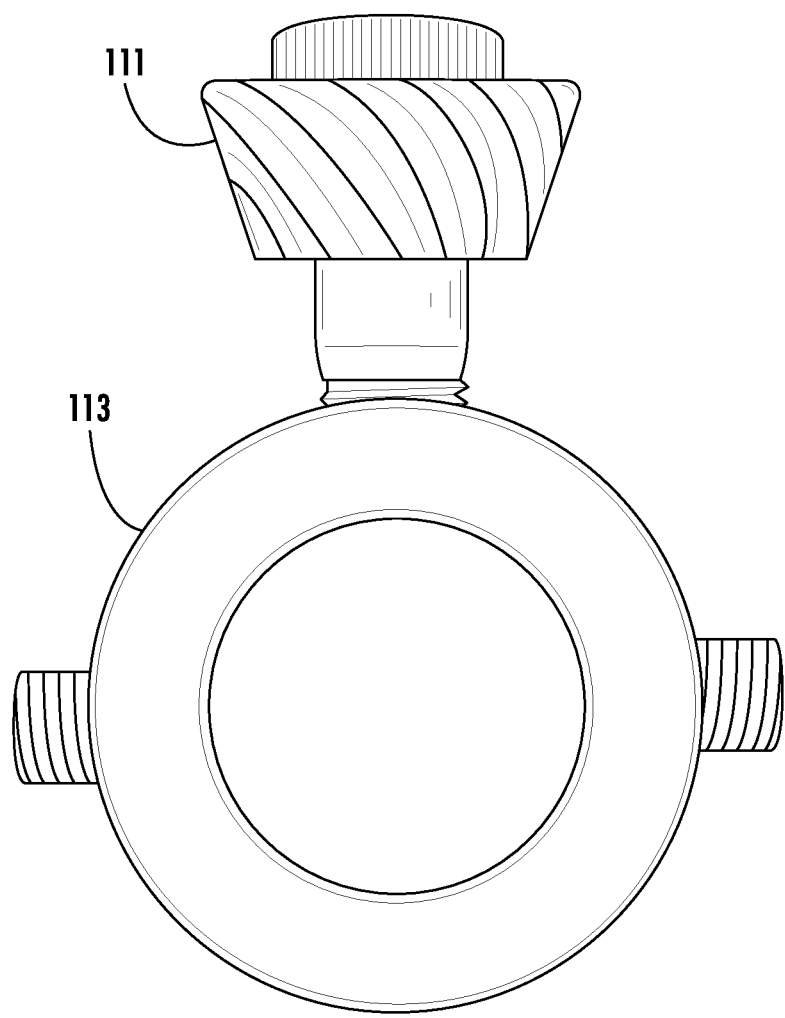
Figure 16:
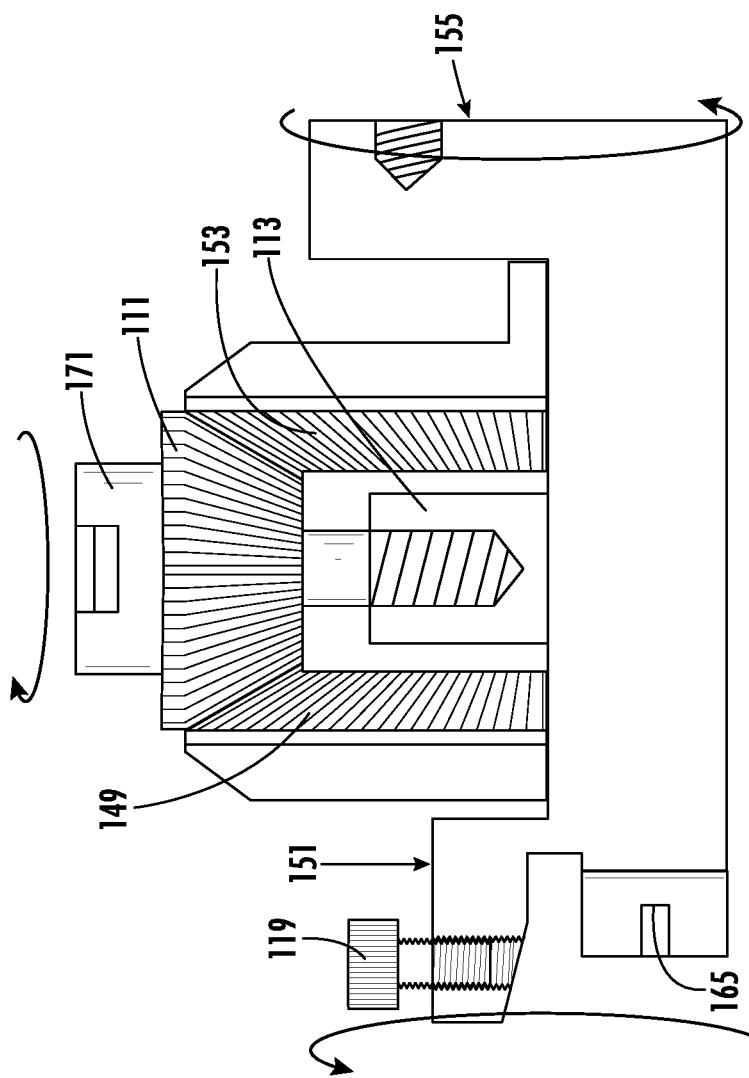
Figure 17:
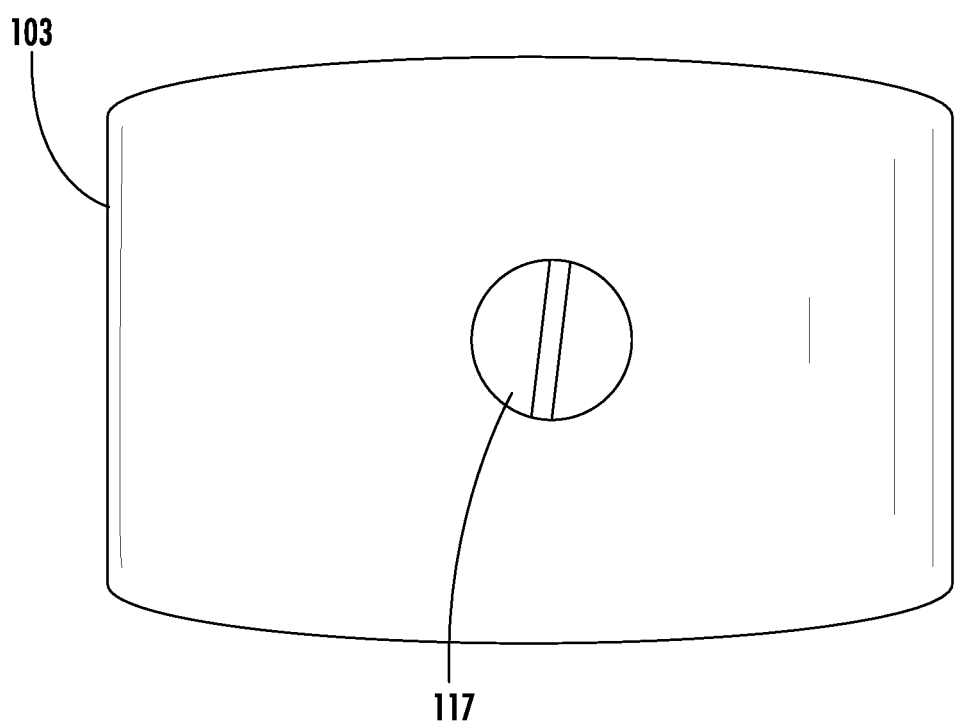
Figure 18:
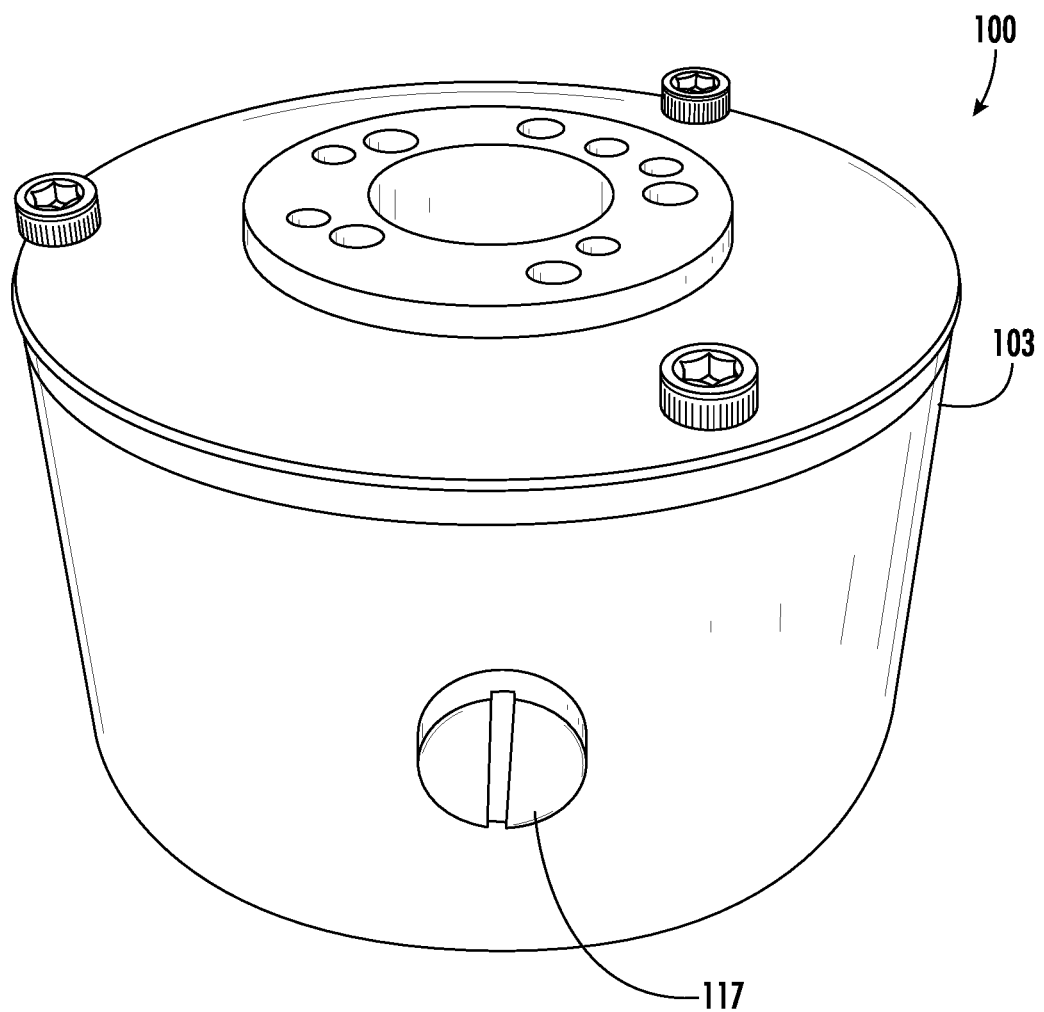
Figure 19:
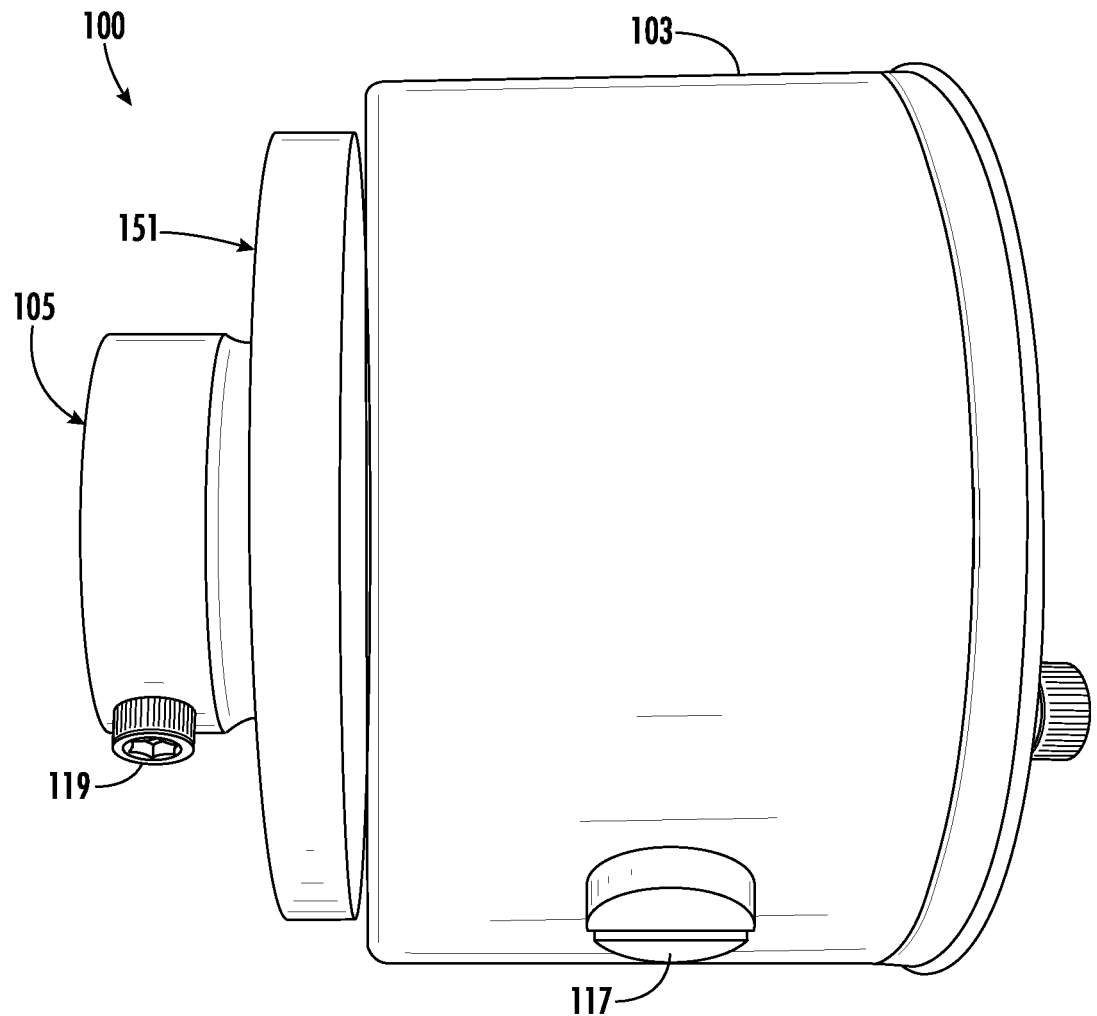
Figure 20:
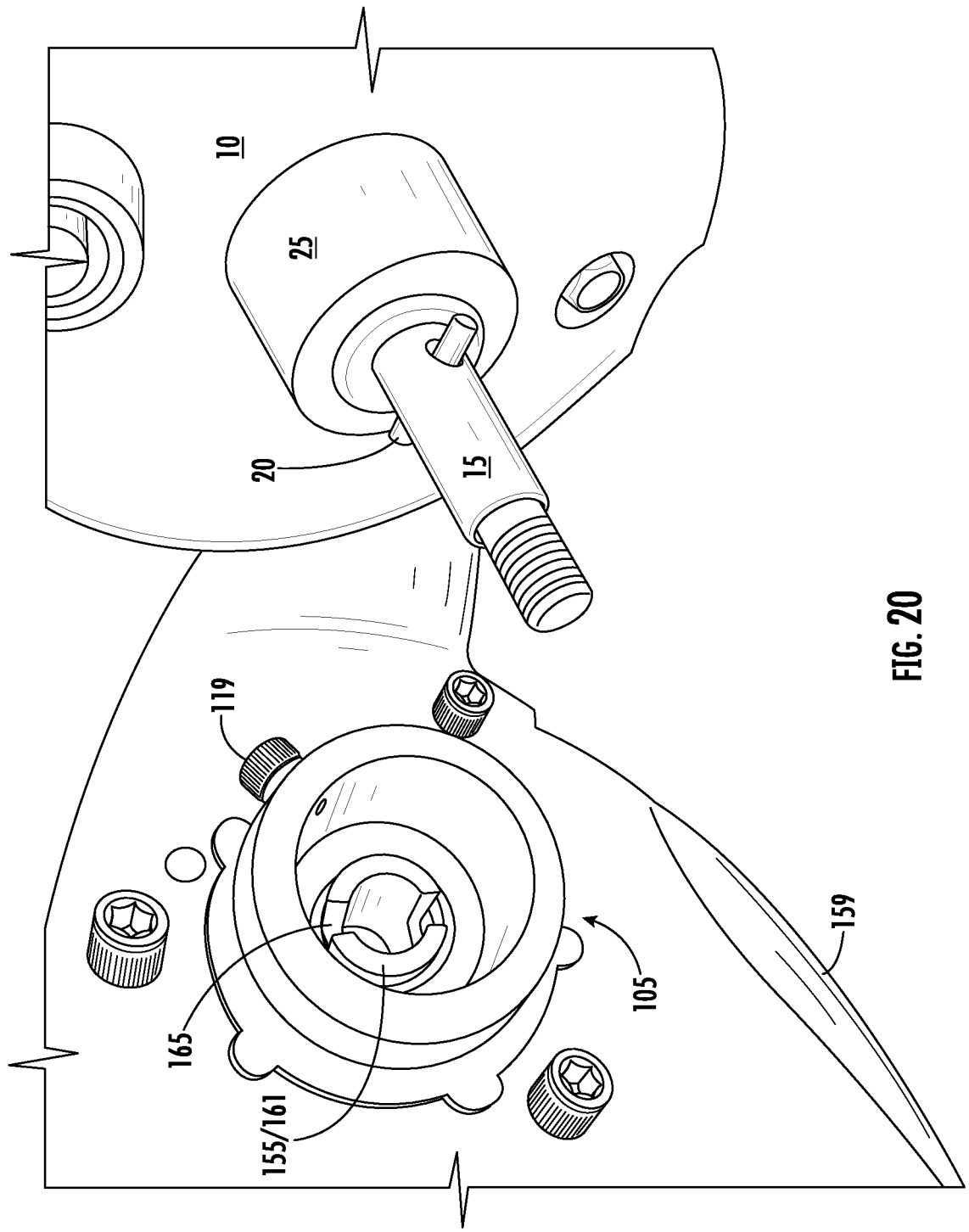
Figure 21:
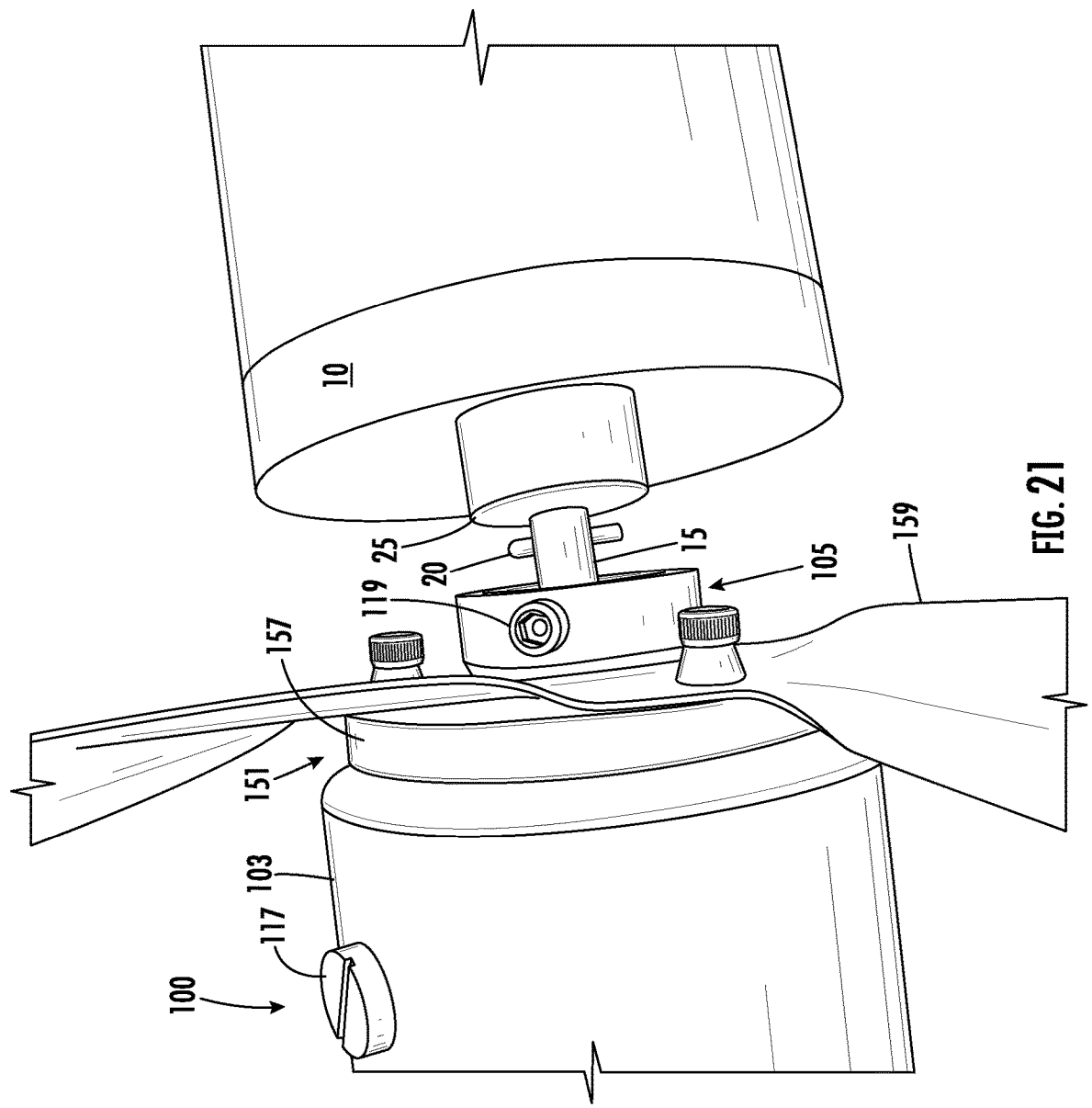
Figure 22:
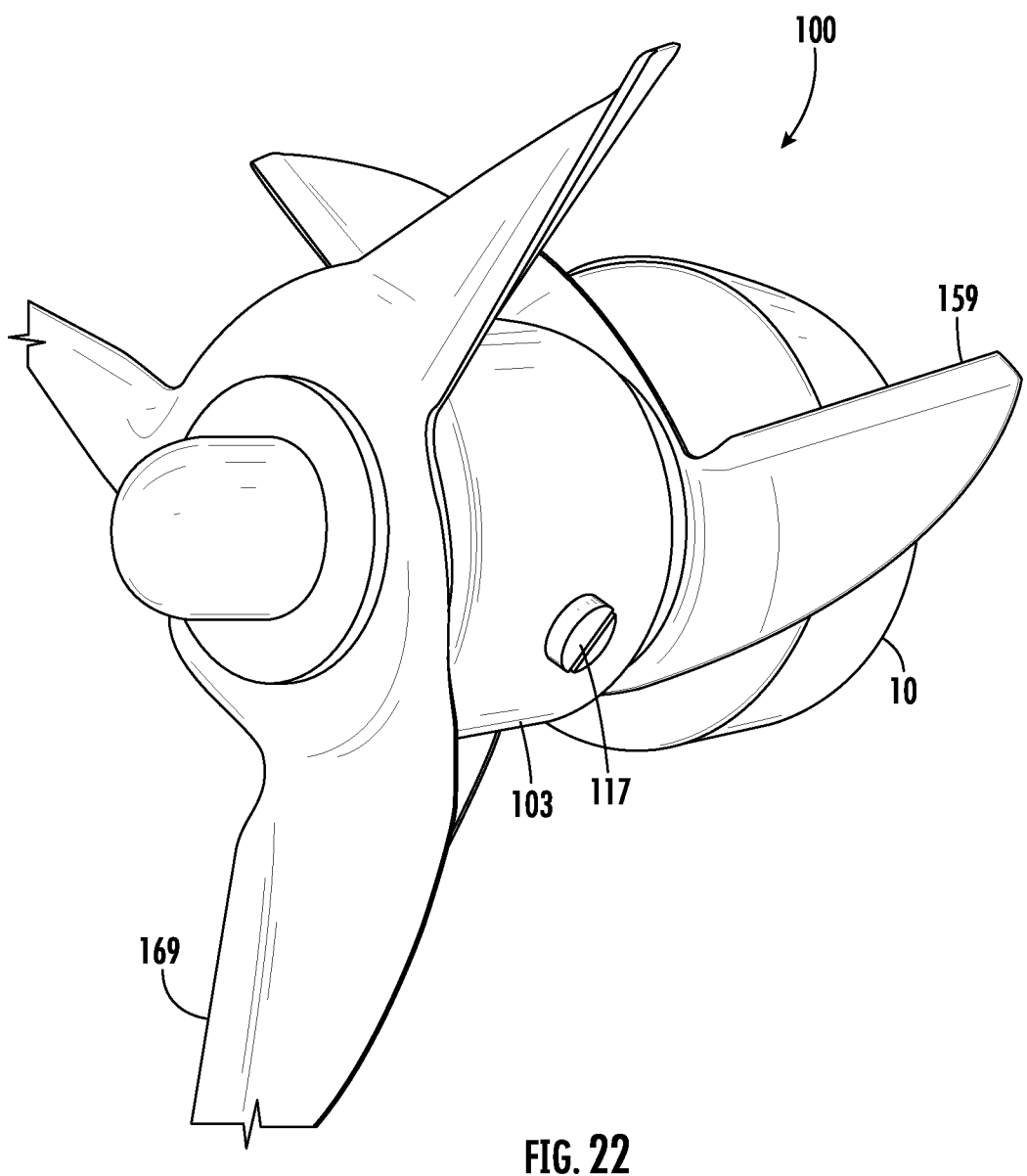
Figure 23:
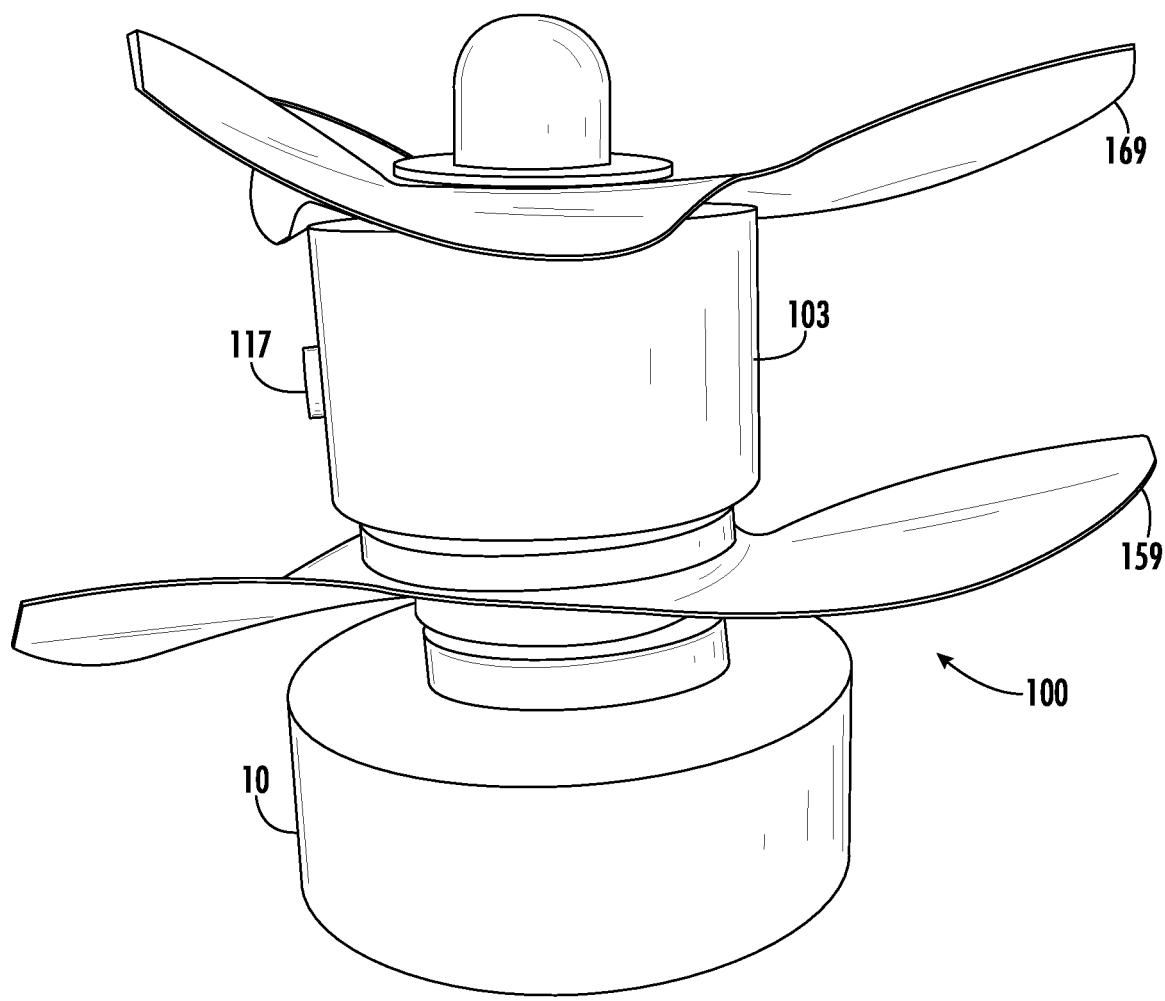

Having thus described the subject matter of the present invention in general terms, reference will now be made to the accompanying drawings, which are not necessarily drawn to scale, and wherein:

FIG. 1 illustrates a cross-sectional view of an example counter rotating gear case, in accordance with an embodiment of the invention;

FIG. 2 illustrates a view of the example counter rotating gear case of FIG. 1, in accordance with an embodiment of the invention;

FIG. 3 illustrates a partial exploded view of the example counter rotating gear case of FIG. 1, in accordance with an embodiment of the invention;

FIG. 4 illustrates a side perspective view of an assembled example counter rotating gear case with props attached, in accordance with an embodiment of the invention;

FIG. 5 illustrates a side view of a spool adapter, in accordance with an embodiment of the invention;

FIG. 6 illustrates a front view of a forward drive gear hub, in accordance with an embodiment of the invention;

FIG. 7 illustrates a front view of a forward drive gear, in accordance with an embodiment of the invention;

FIG. 8 illustrates a view of components of a forward gear thrust bearing, in accordance with an embodiment of the invention;

FIG. 9 illustrates a perspective view of a spool adapter assembled with a forward drive gear hub, in accordance with an embodiment of the invention;

FIG. 10 illustrates a front view of a forward drive gear installed in a housing, in accordance with an embodiment of the invention;

FIG. 11 illustrates a side cross-sectional view of an aft drive gear hub, in accordance with an embodiment of the invention;

FIG. 12 illustrates a side view of an aft gear assembly, in accordance with an embodiment of the invention;

FIG. 13 illustrates a view of components of an aft gear thrust bearing, in accordance with an embodiment of the invention;

FIG. 14 illustrates a side cross-sectional view of a pinion spool spacer, in accordance with an embodiment of the invention;

FIG. 15 illustrates a side view of a pinion spool spacer with a pinion gear installed, in accordance with an embodiment of the invention;

FIG. 16 illustrates a partial side cross-sectional view of a counter rotating gear assembly, in accordance with an embodiment of the invention;

FIG. 17 illustrates a side view of an assembled gear housing, in accordance with an embodiment of the invention;

FIG. 18 illustrates a perspective view of an assembled gear housing, in accordance with an embodiment of the invention;

FIG. 19 illustrates a side view of an assembled gear housing with a forward drive gear hub and spool adapter installed, in accordance with an embodiment of the invention;

FIG. 20 illustrates a perspective view of counter rotating gear case disassembled from a host drive unit, in accordance with an embodiment of the invention;

FIG. 21 illustrates a side view of counter rotating gear case partially assembled with a host drive unit, in accordance with an embodiment of the invention;

FIG. 22 illustrates a perspective view of an assembled counter rotating gear case with counter rotating props, in accordance with an embodiment of the invention; and FIG. 23 illustrates a side view of an assembled counter rotating gear case with counter rotating props, in accordance with an embodiment of the invention.

DETAILED DESCRIPTION

The subject matter of the present invention now will be described more fully hereinafter with reference to the accompanying drawings, in which some, but not all embodiments of the subject matter of the present invention are shown. Like numbers refer to like elements throughout. The subject matter of the present invention may be embodied in many different forms and should not be construed as limited to the embodiments set forth herein; rather, these embodiments are provided so that this disclosure will satisfy applicable legal requirements. Indeed, many modifications and other embodiments of the subject matter of the present invention set forth herein will come to mind to one skilled in the art to which the subject matter of the present invention pertains having the benefit of the teachings presented in the foregoing descriptions and the associated Drawings. Therefore, it is to be understood that the subject matter of the present invention is not to be limited to the specific embodiments disclosed and that modifications and other embodiments are intended to be included within the scope of the appended claims.

In some embodiments, the subject matter of the invention provides a counter rotating gear case to apply to a drive unit, such as a marine trolling motor. However, the counter rotating gear case may be used with a drive unit for other marine/non-marine propulsion system including gas/diesel, electric, etc.

In some embodiments, the subject matter of the invention provides a counter rotating gear case that may be adaptable to any type of drive system, such as, pin drive, square drive, or spline drive, and may be used for drive units of mud motors, trolling motors, bow and stern thrusters, and the like.

In some embodiments, the subject matter of the invention may provide a self-contained counter rotating gear case, for example, for a marine drive unit, which requires no modification to the original marine drive unit, and converts the original single prop drive unit to a double prop counter rotating drive unit.

Referring now to FIGS. 1-23, a counter rotating gear case 100 for a host drive unit 10 is provided. The counter rotating gear case 100 may include a housing 103, spool adapter 105, forward gear assembly 107, an aft gear assembly 109, a pinion gear 111, a pinion spool spacer 113. In one example, spool adapter 105, forward gear assembly 107, aft gear assembly 109, pinion gear 111, pinion spool spacer 113 may be configured together in an assembled state in housing 103. The counter rotating gear case 100 may further include one or more of one or more inner seals 121, and one or more outer seals 123, a prop nut/bolt 115, set screw 119, and drain plug 117.

Spool adapter 105 may be generally tubular in shape, and may include a first portion 125 and a second portion 127. In one example, the first portion 125 of the spool adapter 105 may have a larger diameter than that of the second portion 127. Spool adapter 105 may engage the counter rotating gear case 100 with, for example, a host drive unit 10. In one non-limiting example, the host drive unit 10 may be a trolling motor drive unit. The size and specifications of pool adapter 105, may change depending on the type/brand of host drive unit 10.

Spool adapter 105, in one example, may slide on the prop drive shaft 15 of the host drive unit 10. The first portion 125 of the spool adapter 105 may engage with a hub 25 of the host drive unit 10. In one example, an inner diameter of the first portion 125 of the spool adapter 105 is sized to closely fit about an outside diameter of the hub 25 thereby anchoring the spool adapter 105 (and thereby the entire counter rotating gear case 100) to the host drive unit 10 in stable manner. Set screw 119 may be tightened, as needed, to further secure the spool adapter 105 in place.

Spool adapter 105 may further support the forward drive gear assembly 107 and the aft drive gear assembly 109. The forward drive gear assembly 107 may include drive gear thrust bearings 147, a forward drive gear 149, and a forward drive gear hub 151. The aft drive gear assembly 109 may include drive gear thrust bearings 147, an aft drive gear 153, and an aft drive gear hub 155. Each set of the drive gear thrust bearings 147 may include, for example, inner and outer flat races 173 and a bearings 175. Bearings 175 may be of any suitable type (or types) of bearing, including but not limited to ball, needle, needle, ball, or other type bearing.

In one embodiment, a first set of drive gear thrust bearings 147a may be inserted on a neck portion of the second portion 127 of spool adapter 105, and positioned generally where the neck of second portion 127 and first portion 125 of the spool adapter 105 meet. In one example, the first set of gear thrust bearings 147a may rest against a distal most portion of the first portion 125 of the spool adapter 105. Forward drive gear hub 151 may also be inserted on the neck of second portion 127 of spool adapter 105, such that the first set of gear thrust bearings 147a is sandwiched between the distal portion of the first portion 125 of the spool adapter 105 and a first face of the forward drive gear hub 151, thereby allowing the forward drive gear hub 151 to rotate about the spool adapter 105, which is stationary. Forward drive gear 149 may be attached to a second face of the forward drive gear hub 151, such that rotation of the forward drive gear 149 causes the forward drive gear hub 151 to rotate in the same rotational direction as that of the forward drive gear 149. A second set of gear thrust bearings 147b may be inserted on the spool adapter 105, and positioned immediately adjacent to a side of the forward drive gear 149 opposite that of the side attached to the forward drive gear hub 151. Forward drive gear hub 151 may include flange 157, whereby a forward prop 159 may be attached thereto, such that rotation of the forward drive gear hub 151 causes the forward prop 159 to rotate in the same rotational direction as that of the forward drive gear hub 151. An outer seal 123 may be disposed between an outer surface of the spool adapter and an inward facing surface of the forward gear drive hub. The outer seal 123, in one example, may function to keep water and debris (mud, etc.) from getting into the counter rotating gear case 100, and/or to keep gear oil/lubricant within the counter rotating gear case 100. The outer seal 123, may be made of any suitable material, such as, but not limited to, rubber, silicone, or any other suitable material.

The aft drive gear hub 155 may be generally tubular in shape, and may include a first portion 161 and a second portion 163, wherein the first portion 161 of the aft drive gear hub 155 may have a smaller diameter than that of the second portion 163. In one example, the first portion 161 of the aft drive gear hub 155 is sized such that it may be inserted into an interior region of the second portion 127 of the spool adapter 105, and extends into the first portion 125 of the spool adapter 105. An end most portion of the first portion 161 of the aft drive gear hub 155 may have a one or more cut out regions 165. The one or more cut out regions 165 are capable of receiving a horizontal profile of a drive/shear pin 20 of the drive shaft 15 of the host drive unit 10, such that when received within the one or more cut out regions 165, rotation of the drive/shear pin 20 by the drive shaft 15 of the host drive unit 10, causes the aft drive gear hub 155 to rotate in the same rotational direction as that of the drive shaft 15. An inner seal 121 may be disposed between an outer surface of the first portion 161 of the aft drive gear hub 155 and an inner surface of the of the spool adapter 105 within which the first portion 161 of the aft drive gear hub 155 is inserted in. The inner seal 121, in one example, may function to keep water and debris (mud, etc.) from getting into the interior region of the counter rotating gear case 100, and/or to also keep gear oil/lubricant within the interior region of the counter rotating gear case 100. The inner seal 121 may be made of any suitable material, such as, but not limited to, rubber, silicone, or any other suitable material. The first portion 161 of the aft drive gear hub 155 may further include a groove 166, for example for a snap ring (not shown) or the like.

The aft drive gear 153 may be attached to a first face of the aft drive gear hub 155, such that rotation of the aft drive gear hub 155 causes the aft drive gear 153 to rotate in the same rotational direction as that of the aft drive gear hub 155. A third set of gear thrust bearings 147c may be inserted on the aft drive gear hub 155 and positioned immediately adjacent to a side of the aft drive gear 153 opposite that of the side attached to the aft drive gear hub 155. An aft prop 169 may be attached to an outward facing surface 167 of the second portion 163 of the aft drive gear hub 155, such that rotation of the aft drive gear hub 155 causes the aft prop 169 to rotate in the same rotational direction as that of the aft drive gear hub 155.

The counter rotating gear case 100 may further include a pinion gear 111 and pinion spool spacer 113. Pinion gear 111 and pinion spool spacer 113 function to enable the counter rotation action of the forward prop 159 and aft prop relative to one another. In one example, pinion spool spacer 113 is installed on the second portion 127 of the spool adapter 105, and positioned between the second set of gear thrust bearings 147b and third set of gear thrust bearings 147c, such that forward drive gear 149 and aft drive gear 153 are spaced apart from one another by the width of pinion spool spacer 113, and wherein the second set of gear thrust bearings 147b and third set of gear thrust bearings 147c allow the forward drive gear 149 and aft drive gear 153 to rotate against the pinion spool spacer 113, which remains stationary.

In one example, pinion gear 111 is installed in the counter rotating gear case 100, by for example a pinion bolt 171, or other suitable mechanism. Pinion gear 111 is positioned between the forward drive gear 149 and the aft drive gear 153, such that the gear teeth of pinion gear 111 engage simultaneously with the gear teeth of both the forward drive gear 149 and the aft drive gear 153.

In one example, when the counter rotating gear case 100 is installed on the drive shaft 15 of the host drive unit 10. The drive shaft 15 passes through a center portion of the counter rotating gear case 100, i.e., through spool adapter 105 and a portion of the aft drive gear hub 155, thus allowing the counter rotating gear case 100 to reach down to the drive/shear pin 20 of the host drive unit 10. The drive pin 20 engages with the one or more cut out regions 165 of the aft drive gear hub 155 and acts to rotate the aft drive gear hub 155 as the drive shaft 15 of the host drive unit 10 rotates, and in the same rotational direction. As the aft drive gear hub 155 rotates in a first rotational direction, for example, counter-clockwise, the aft drive gear 153, attached to the aft drive gear hub 155, also rotates in the same first rotational direction. The rotation of the aft drive gear 153, which is engaged with the pinion gear 111, reacts against the pinion gear 111 causing the pinion gear 111 to rotate. Rotation of the pinion gear 111, which is also engaged with the forward drive gear 149, causes forward drive gear hub 151, attached to the forward drive gear 149, to turn in a second rotational direction, i.e., opposite that of the first rotational direction, for example, clockwise. As a result, the forward prop 159, engaged with the forward drive gear hub 151, and the aft prop 169, engaged with the aft drive gear hub 155, counter rotate relative to one another.

The counter rotating gear case 100, may further include a drain plug 117. The drain plug 117, may be positioned on an underside portion of the housing 103. In one example, drain plug 117 may be removed to fill or drain gear oil from the interior of counter rotating gear case 100. The drain plug 117, may further include a gasket (not shown) to seal the drain plug 117 when installed.

To install the counter rotating gear case 100 to the host drive unit 10, the original propeller, if installed, may be removed from the host drive unit 10, and counter rotating gear case 100 is slide onto the drive shaft 15 of the host drive unit 10. Once seated in place on the drive shaft 15, with the one or more cut out regions 165 of the aft drive gear hub 155 engaged with the drive pin 20, the set screw 119 of the counter rotating gear case 100 may be tightened and the prop nut 115 installed to secure the counter rotating gear case 100 to the drive shaft 15 of the host drive unit 10. Different props or prop blades, designed for differing conditions or preferences, may be installed.

To remove the counter rotating gear case 100 from the host drive unit 10, the prop nut 115 may be removed and the set screw 119 on the counter rotating gear case 100 loosened. Once the prop nut 115 is removed and the set screw 119 loosened, the counter rotating gear case 100 maybe slid off the drive shaft 15 of the host drive unit 10. At this point, the original prop may be reinstalled, or a different counter rotating gear case 100 may be installed and/or different props.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the present invention. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A counter rotating gear case, comprising:
   a. a forward gear assembly;
   b. an aft gear assembly;
   c. a pinion gear assembly;
   d. a spool adapter having a first portion and a second portion, wherein the forward gear assembly, the aft gear assembly, and pinion gear assembly are supported on the second portion of the spool adapter, and wherein, the pinion gear assembly is disposed between the forward gear assembly and the aft gear assembly, and wherein the pinion gear assembly is operatively engaged with both the forward gear assembly and the aft gear assembly, such that rotation of one of the forward gear assembly or the aft gear assembly in one direction causes rotation of the other of the forward gear assembly or the aft gear assembly in a second direction opposite that of the first direction; and
      wherein the forward gear assembly, comprises first set of drive gear thrust bearings, a forward drive gear, and a forward drive gear hub, wherein the first set of drive gear thrust bearings are positioned on a first side of the forward drive gear hub and the forward drive gear is fixedly attached to second side of the forward drive gear hub; and wherein the aft gear assembly, comprises a third set of drive gear thrust bearings, an aft drive gear, and an aft drive gear hub, wherein the third set of drive gear thrust bearings are positioned on a first side of the aft drive gear and the aft drive gear hub is fixedly attached to a second side of the aft drive gear.

2. The counter rotating gear case of claim 1, wherein the first portion of the spool adapter is configured to engage with a hub portion of a host drive unit to attach the counter rotating gear case thereto.

3. The counter rotating gear case of claim 1, wherein rotation of the forward drive gear causes rotation of the forward drive gear hub in a same direction as that of the forward drive gear, and wherein rotation of the aft drive gear causes rotation of the aft drive gear hub in a same direction as that of the aft drive gear.

4. The counter rotating gear case of claim 1, wherein the aft drive gear hub comprises a first portion and a second portion, and wherein the first portion of the aft drive gear hub is configured to be received within a hollow shaft portion extending through a center longitudinal axis of the spool adapter, the first portion of the aft drive gear hub extending through the first portion of the spool adapter and at least partially through the second portion of the spool adapter.

5. The counter rotating gear case of claim 4, wherein a distal end of the first portion of the aft drive gear hub is configured to engage with a drive shaft of a host drive unit such that rotation of the drive shaft of the host drive unit causes the aft drive gear hub to rotate in the same direction as that of the drive shaft of the host drive unit.

6. The counter rotating gear case of claim 1, wherein the forward drive gear hub comprises a flange configured to receive a forward prop.

7. The counter rotating gear case of claim 1, wherein the pinion gear assembly comprises a pinion gear and a pinion spool spacer, wherein the pinion spool spacer provides a spacing to allow the pinion gear to fit between and operatively engage with the forward drive gear and the aft drive gear simultaneously.

8. The counter rotating gear case of claim 7, wherein the pinion gear assembly further comprises a second set of drive gear thrust bearings and the third set of drive gear thrust bearings, wherein the second set of drive gear thrust bearings is positioned between the forward drive gear and a first side surface of the pinion spool spacer and the third set of drive gear thrust bearings is positioned between the aft drive gear and a second side surface of the pinion spool spacer, and wherein the second and third sets of drive gear thrust bearings allow the forward drive gear and the aft drive gear to rotate freely about the first side surface of the pinion spool spacer and the second side surface of the pinion spool spacer, respectively.

9. The counter rotating gear case of claim 8, wherein the first, second, and third sets of drive gear thrust bearings each comprise: an inner flat race; an outer flat race; and bearings sandwiched between the inner flat race and outer flat race.

10. The counter rotating gear case of claim 1, wherein the forward drive gear hub is positioned at a neck portion at the intersection of the first portion and second portion of the spool adapter, and wherein the first set of drive gear thrust bearings is sandwiched between the neck portion and a side surface of the forward drive gear hub allowing the forward drive gear hub to freely rotate upon rotation of the front drive gear.

11. A method of installing a counter rotating gear case to a host drive unit, the method comprising:
   a. providing an assembled counter rotating gear case, comprising:
      i. a forward gear assembly;
      ii. an aft gear assembly;
      iii. a pinion gear assembly;
      iv. a spool adapter having a first portion and a second portion, wherein the forward gear assembly, the aft gear assembly, and pinion gear assembly are supported on the second portion of the spool adapter;
      v. wherein, the pinion gear assembly is disposed between the forward gear assembly and the aft gear assembly, and wherein the pinion gear assembly is operatively engaged with both the forward gear assembly and the aft gear assembly, such that rotation of one of the forward gear assembly or the aft gear assembly in one direction causes rotation of the other of the forward gear assembly or the aft gear assembly in a second direction opposite that of the first direction; and vi. wherein the forward gear assembly, comprises first set of drive gear thrust bearings, a forward drive gear, and a forward drive gear hub, wherein the first set of drive gear thrust bearings are positioned on a first side of the forward drive gear hub and the forward drive gear is fixedly attached to second side of the forward drive gear hub; and wherein the aft gear assembly, comprises a third set of drive gear thrust bearings, an aft drive gear, and an aft drive gear hub, wherein the third set of drive gear thrust bearings are positioned on a first side of the aft drive gear and the aft drive gear hub is fixedly attached to a second side of the aft drive gear;

b. installing the assembled counter rotating gear case to a drive shaft of the host drive unit; and c. securing the installed assembled counter rotating gear case to the host drive unit.

12. The method of claim 11, further comprising, prior to installing the assembled counter rotating gear case to the drive shaft of the host drive unit, removing a current propeller from the host drive unit.

13. The method of claim 11, wherein installing the assembled counter rotating gear case to the drive shaft of the host drive unit, comprises sliding the assembled counter rotating gear case onto a hub portion of the host drive unit such that a first portion of the spool adapter is positioned about an outer surface of the hub portion of the host drive unit and a distal end of a first portion of the aft drive gear hub operatively engages with a drive pin on the drive shaft of the host drive unit.

14. The method of claim 11, wherein securing the installed assembled counter rotating gear case to the host drive unit, comprises tightening a set screw at the first portion of the spool adapter such that it is secures the assembled counter rotating gear case to the hub portion of host drive unit.

15. The method of claim 14, further comprising inserting a prop nut at the aft drive gear hub and tightening.

16. A method of installing a counter rotating gear case to a host drive unit, the method comprising:

a. providing an assembled counter rotating gear case attached to a host drive unit, the assembled counter rotating gear case, comprising:

i. a forward gear assembly;

ii. an aft gear assembly;

iii. a pinion gear assembly;

iv. a spool adapter having a first portion and a second portion, wherein the forward gear assembly, the aft gear assembly, and pinion gear assembly are supported on the second portion of the spool adapter;

v. wherein, the pinion gear assembly is disposed between the forward gear assembly and the aft gear assembly, and wherein the pinion gear assembly is operatively engaged with both the forward gear assembly and the aft gear assembly, such that rotation of one of the forward gear assembly or the aft gear assembly in one direction causes rotation of the other of the forward gear assembly or the aft gear assembly in a second direction opposite that of the first direction; and vi. wherein the forward gear assembly, comprises first set of drive gear thrust bearings, a forward drive gear, and a forward drive gear hub, wherein the first set of drive gear thrust bearings are positioned on a first side of the forward drive gear hub and the forward drive gear is fixedly attached to second side of the forward drive gear hub; and wherein the aft gear assembly, comprises a third set of drive gear thrust bearings, an aft drive gear), and an aft drive gear hub, wherein the third set of drive gear thrust bearings are positioned on a first side of the aft drive gear and the aft drive gear hub is fixedly attached to a second side of the aft drive gear;

b. unsecuring the installed assembled counter rotating gear case from the host drive unit; and c. removing the assembled counter rotating gear case from the host drive unit.

17. The method of claim 16, wherein unsecuring the installed assembled counter rotating gear case from the host drive unit, comprises removing an installed prop nut from the aft drive gear hub and loosening a set screw that secured a first portion of the spool adapter of the assembled counter rotating gear case to a hub portion of the host drive unit.

* * * * *